(12) United States Patent
Flannery

(10) Patent No.: US 12,719,102 B2
(45) Date of Patent: Aug. 25, 2026

(54) FLEXIBLE HEAT TRANSFER MATERIAL

(71) Applicant: XEROTECH LIMITED, Oranmore (IE)

(72) Inventor: Barry Flannery, Oranmore (IE)

(73) Assignee: Reelred Limited, Dublin (IE)

( * ) Notice: Subject to any disclaimer, the term of this patent is extended or adjusted under 35 U.S.C. 154(b) by 862 days.

(21) Appl. No.: 17/769,737

(22) PCT Filed: Oct. 19, 2020

(86) PCT No.: PCT/EP2020/079410
§ 371 (c)(1),
(2) Date: Apr. 16, 2022

(87) PCT Pub. No.: WO2021/074457
PCT Pub. Date: Apr. 22, 2021

(65) Prior Publication Data

US 2022/0384873 A1 Dec. 1, 2022

(30) Foreign Application Priority Data

Oct. 18, 2019 (GB) ..................................... 1915157

(51) Int. Cl.
*H01M 10/653* (2014.01)
*H01M 10/613* (2014.01)
(Continued)

(52) U.S. Cl.
CPC ....... *H01M 10/653* (2015.04); *H01M 10/613* (2015.04); *H01M 10/643* (2015.04); *H01M 10/6551* (2015.04); *H01M 10/6567* (2015.04)

(58) Field of Classification Search
CPC .. H01M 10/653; H01M 10/643; H01M 10/61; H01M 10/613
See application file for complete search history.

(56) References Cited

U.S. PATENT DOCUMENTS 3,042,733 A * 7/1962 Toda ...................... H01M 6/46 429/66
9,865,905 B2 1/2018 Yang
(Continued)

FOREIGN PATENT DOCUMENTS

CN 205882125 U 1/2017
CN 108511844 A 9/2018
(Continued)

OTHER PUBLICATIONS

Machine Translation of Matsushita, JP 2005-339932A, Dec. 8, 2005.*

(Continued)

*Primary Examiner* — Kenneth J Douyette
(74) *Attorney, Agent, or Firm* — Renner, Kenner; Arthur M. Reginelli

(57) ABSTRACT

A flexible heat transfer material 1 for thermally contacting at least one cell within a battery pack 10, and a method of forming a flexible heat transfer material 1. The flexible heat transfer material 1 is conformable to at least part of the surface shape of at least one cell 20. The flexible heat transfer material 1 comprises a matrix 2 and a filler 3, wherein the thermal conductivity of the filler 3 is greater than the thermal conductivity of the matrix 2.

26 Claims, 8 Drawing Sheets

(51) Int. Cl.

| | |
|---|---|
| ***H01M 10/643*** | (2014.01) |
| ***H01M 10/655*** | (2014.01) |
| ***H01M 10/6551*** | (2014.01) |
| *H01M 10/6567* | (2014.01) |

(56) References Cited

U.S. PATENT DOCUMENTS

| | | | | |
|---|---|---|---|---|
| 2017/0040653 | A1* | 2/2017 | Morris | H01M 10/647 |
| 2017/0179554 | A1* | 6/2017 | Pingree | H01M 10/0525 |
| 2018/0191042 | A1 | 7/2018 | Chu | |
| 2021/0320343 | A1 | 10/2021 | Flannery | |

FOREIGN PATENT DOCUMENTS

| | | | |
|---|---|---|---|
| EP | 3188303 | A1 | 7/2017 |
| JP | 2005339932 | A * | 12/2005 |
| WO | 2019024616 | A1 | 2/2019 |
| WO | 2020094365 | A1 | 5/2020 |

OTHER PUBLICATIONS

International Search Report and Written Opinion for corresponding PCT/EP2020/079410 dated Feb. 3, 2021 (14 pp).

* cited by examiner

FLEXIBLE HEAT TRANSFER MATERIAL

The present invention relates to a heat transfer material, particularly for use within a battery pack.

When designing ducts used in thermal management of electrical components, the choice of duct material is crucial. Flexible duct materials such as low-density polyethylene (LDPE) provide several advantages over rigid duct materials such as aluminium or copper. Firstly, increasing coolant pressure within a flexible duct causes the duct to closely conform to the surface of the electrical components that are being thermally managed. Such inflation improves thermal contact by increasing the duct-component contact area and contact pressure. In contrast, rigid ducts have a fixed volume; increasing coolant pressure within a rigid duct has little or no effect on duct-component thermal coupling. Secondly, flexible ducts are often made from electrically insulating materials, meaning that the risk of creating an unwanted electrical path (i.e. a short circuit) between electrical components being thermally managed is lower than for e.g. rigid metallic ducts. Although this risk of creating short circuits by a metallic duct can be reduced by providing a thermal interface material (TIM) such as silicone rubber around the duct, TIMs significantly increase the thermal resistance between the duct and the component(s) being thermally managed.

Until now, a significant drawback of using flexible materials for thermal management ducts and TIMs has been their relatively low thermal conductivities which can lead to poor heat transfer through the duct walls and along the duct, resulting in 'hot spots'. Where a flexible duct of the prior art is employed in a battery pack, the high thermal resistance along the duct can lead to an uneven temperature distribution within the pack, causing uneven cell ageing as well as an elevated overall pack temperature. High thermal resistance between the heat transfer media and the cells can be overcome by increasing the temperature differential but this has the negative effect of exacerbating internal cell temperature gradients. At room temperature the thermal conductivity of e.g. high-density polymer is typically between 0.33 and 0.52 $Wm^{-1}K^{-1}$. This is significantly lower than 237 $Wm^{-1}K^{-1}$ for room temperature aluminium. There exists a need for a material which is both flexible and exhibits an increased thermal conductivity.

It is an object of the invention to obviate or mitigate the problems outlined above. In particular, it is an object of the present invention to provide a heat transfer material having an increased thermal conductivity.

It is a yet further object of the invention to provide a heat transfer material having a low electrical conductivity.

It is a further object of the invention to provide a heat transfer material which can be formed as a TIM or inflatable duct.

It is a yet further object of the invention to provide a heat transfer material that can be used to thermally manage cells in a battery pack.

According to a first aspect of the invention there is provided a flexible heat transfer material for thermally contacting at least one cell within a battery pack, the flexible heat transfer material being conformable to at least part of the surface shape of at least one cell, the flexible heat transfer material comprising a matrix and a filler, wherein the thermal conductivity of the filler is greater than the thermal conductivity of the matrix. Advantageously, the inclusion of filler within the matrix increases the thermal conductivity of the heat transfer material.

Preferably the matrix is a flexible matrix.

Preferably the matrix is a plastic matrix.

Preferably the matrix is a polymer matrix.

Preferably the matrix is a polyethylene (PE) matrix.

Preferably the matrix is a low-density polyethylene (LDPE) matrix.

Preferably the matrix is a linear low-density polyethylene (LLDPE) matrix.

Optionally the matrix is a high-density polyethylene (HDPE) matrix.

Optionally the matrix is a polyester, silicone or rubber matrix.

Preferably the matrix has a thermal conductivity less than 15 $Wm^{-1}K^{-1}$.

Preferably the matrix has a thermal conductivity less than 10 $Wm^{-1}K^{-1}$.

Preferably the matrix has a thermal conductivity less than 5 $Wm^{-1}K^{-1}$.

Preferably the matrix has a thermal conductivity less than 1 $Wm^{-1}K^{-1}$.

Preferably the filler comprises particles of a filler material.

Preferably the particles of filler material are dispersed throughout the matrix.

Preferably the particles of filler material have an average diameter of between 1 nm and 10 μm.

Preferably the particles of filler material are elongate.

Preferably the particles of filler material are tubular.

Optionally the particles of filler material are platelets such as graphite platelets.

Preferably the elongate particles of filler material have a diameter of 1-10 nm.

Preferably the elongate particles of filler material have a length of 0.5-5 nm.

Optionally the particles of filler material are substantially spherical.

Optionally the particles of filler material are fibers.

Preferably the filler comprises an organic filler material.

Preferably the filler is carbon-based.

Preferably the filler comprises carbon, carbon black, graphite, graphene, multi-walled carbon nanotubes or single-wall carbon nanotubes.

Optionally the filler comprises an inorganic filler material.

Optionally the filler comprises a ceramic filler material.

Optionally the filler comprises aluminium oxide, silicon carbide, boron nitride, silicon nitrate, alumina, aluminium nitride or zinc oxide.

Preferably the filler comprises a mixture of different types of particles.

Preferably the filler comprises a mixture of at least two different types of particles.

Preferably the filler comprises a mixture of carbon-based particles and ceramic-based particles.

Preferably the filler comprises a mixture of graphite particles and ceramic-based particles.

Preferably the filler comprises a mixture of carbon-based particles and boron nitride particles.

Preferably the filler comprises a mixture of graphite particles and boron nitride particles. Preferably the boron nitride particles have a size less than 5 μm.

Preferably the filler comprises a mixture of carbon-based particles and ceramic-based particles in a predetermined ratio.

Preferably the filler comprises a mixture of carbon-based particles and ceramic-based particles in any predetermined ratio by volume.

Preferably the predetermined ratio of carbon-based particles to ceramic-based particles is 1:1 by volume.

Preferably the predetermined ratio of carbon-based particles to ceramic-based particles is between 1:10 and 10:1 by volume.

Preferably the filler has a thermal conductivity greater than 10 $Wm^{-1}K^{-1}$.

Preferably the filler has a thermal conductivity greater than 100 $Wm^{-1}K^{-1}$.

Preferably the heat transfer material comprises up to 30% by volume of filler.

Preferably the heat transfer material comprises less than 25% by volume of filler. Advantageously, incorporating a limited amount of filler into the matrix provides an increased thermal conductivity while maintaining a low electrical conductivity and suitable flexibility of the material.

Preferably the heat transfer material comprises 5-18% by volume of filler.

Preferably the heat transfer material comprises 15% by volume of filler.

Preferably the heat transfer material has a thermal conductivity approximately 0.8 $Wm^{-1}K^{-1}$.

Preferably the heat transfer material has a thermal conductivity greater than 0.33 $Wm^{-1}K^{-1}$ at room temperature.

Preferably the heat transfer material has a thermal conductivity greater than 0.8 $Wm^{-1}K^{1}$ at room temperature.

Ideally the heat transfer material has a thermal conductivity greater than 1 $Wm^{-1}K^{-1}$ at room temperature.

Preferably the heat transfer material has a thermal conductivity greater than 10 $Wm^{-1}K^{-1}$ at room temperature.

Preferably the matrix is electrically insulating.

Preferably the heat transfer material is elastically deformable.

Preferably the heat transfer material has a Young's modulus of less than 450 MPa.

Preferably the heat transfer material has a Young's modulus of less than 300 MPa.

Preferably the heat transfer material has a Young's modulus of less than 150 MPa.

Preferably the heat transfer material has a thickness of 25-150 μm.

Ideally the heat transfer material has a thickness of 100 μm.

Ideally the heat transfer material is tubular.

Optionally the heat transfer material is in sheet form.

Optionally the heat transfer material is located between a metallic duct and an electrical component such as a cylindrical cell.

Preferably the heat transfer material forms at least a part of a duct.

Preferably the heat transfer material forms a duct.

Preferably the duct is serpentine duct.

Preferably the duct is a manifold duct.

Preferably the duct is a multi-lumen duct.

Preferably the duct is a flexible bladder.

Preferably the duct is inflatable.

Preferably the duct is fillable with coolant material.

Preferably the coolant material is air, water or a water-glycol mixture.

Preferably the flexible heat transfer material is compatible with the coolant material.

Preferably the flexible heat transfer material is compatible with ethylene glycol, water, oil and/or another liquid/gaseous pressurised coolant.

Preferably the duct is located within a battery pack.

Preferably the battery pack comprises one or more cells.

Preferably at least part of the duct is in contact with the surface of at least one cell.

Preferably the duct is inflated such that at least part of the duct conforms to at least part of the surface shape of at least one cell.

Preferably the duct has an absolute thermal resistance of less than 0.5 $KW^{-1}$.

Preferably the duct has an absolute thermal resistance of less than 0.05 $KW^{-1}$.

Preferably the duct has an absolute thermal resistance of less than 0.005 $KW^{-1}$.

Preferably the height of the duct is equal to or less than 70 mm.

Preferably the height of the duct is between 65 mm and 70 mm.

Preferably the height of the duct is between 55 mm and 70 mm.

Preferably the width of the duct in the inflated state between 1 mm and 3 mm.

Preferably the duct is reinforced by a reinforcing means.

Preferably the duct is at least partially surrounded by a reinforcing means. Advantageously, the reinforcing means prevents the duct from over-inflating and/or bursting during use. This is especially important in ducts for which the filler alters the mechanical properties of the matrix and/or reduces the mechanical strength of the flexible heat transfer material.

Preferably the duct is at least partially supported by a reinforcing means.

Preferably the reinforcing means is a potting material.

Preferably the reinforcing means is an expandable potting material.

Preferably the reinforcing means is intumescent foam, polyurethane foam or epoxy resin.

According to a second aspect of the invention there is provided a method of forming a flexible heat transfer material for thermally contacting at least one cell within a battery pack, the flexible heat transfer material being conformable to at least part of the surface shape of at least one cell, the flexible heat transfer material comprising a matrix and a filler, the method comprising: preparing a mixture comprising the filler and a viscous material capable of forming the matrix; forming the mixture into a desired shape; and hardening, curing or drying the mixture to form the flexible heat transfer material, wherein the thermal conductivity of the filler is greater than the thermal conductivity of the matrix. Advantageously, the method provides a process by which a heat transfer material having a desired flexibility and thermal conductivity can be produced in a suitable shape or form.

Ideally the method comprises forming the viscous material by heating a raw material such that the raw material enters a viscous state.

Ideally the method comprises forming the viscous material by heating pellets or granules of the raw material.

Ideally the method comprises forming the viscous material by heating pellets of raw material wherein the pellets of raw material comprise the matrix.

Ideally the method comprises heating pellets of a polymer.

Ideally the method comprises heating pellets of a plastic material.

Ideally the method comprises heating pellets of LDPE, LLDPE, HDPE, polyester, silicone or rubber.

Optionally the method comprises forming the viscous material by heating pellets of raw material wherein the pellets of raw material comprise the matrix and the filler.

Ideally the method comprises heating the raw material to at least 130° C.

Ideally the method comprises heating the raw material to 150° C.

Optionally the method comprises forming the viscous material by dissolving the raw material in a solvent Optionally the method comprises evaporating the solvent.

Optionally the method comprises forming the viscous material by mixing and/or heating one or more precursor materials such that the precursor materials undergo a polymerization reaction.

Preferably the method comprises wetting the filler.

Preferably the method comprises adding the filler to the viscous material.

Preferably the method comprises adding an organic filler to the viscous material.

Preferably the method comprises adding the filler to the viscous material wherein the filler comprises carbon, carbon black, graphite, graphene, multi-walled carbon nanotubes or single-wall carbon nanotubes.

Preferably the method comprises adding an inorganic filler to the viscous material.

Preferably the method comprises adding a carbon-based filler and a ceramic filler to the viscous material.

Preferably the method comprises adding the filler to the viscous material wherein the filler comprises aluminium oxide, silicon carbide, boron nitride, silicon nitrate, alumina, aluminium nitride or zinc oxide.

Preferably the method comprises pouring particles of the filler into the viscous material.

Preferably the method comprises adding less than 30% by volume of the filler to the viscous material.

Preferably the method comprises adding less than 25% by volume of the filler to the viscous material.

Preferably the method comprises adding 5-18% by volume of the filler to the viscous material.

Preferably the method comprises adding 15% by volume of the filler to the viscous material.

Preferably the method comprises agitating the mixture. Advantageously, agitating the mixture causes the filler to be evenly dispersed throughout the mixture.

Preferably the method comprises agitating the mixture by stirring.

Preferably the method comprises mixing the filler and raw material.

Preferably the method comprises shear mixing the filler and raw material.

Preferably the method comprises mixing the filler and raw material at 200° C.

Preferably the method comprises mixing the filler and raw material at 100-600 rpm.

Preferably the method comprises agitating or mixing the filler and raw material for a predetermined length of time.

Preferably the method comprises agitating or mixing the filler and raw material for 1-25 minutes.

Preferably the method comprises agitating or mixing the filler and raw material for 5 minutes.

Preferably the method comprises blow moulding or blown film extrusion.

Preferably the method comprises blown film extrusion of the mixture.

Preferably the method comprises blow moulding the mixture.

Preferably the method comprises forming the mixture into a tubular shape.

Preferably the method comprises forming the mixture into a shape having a wall thickness of 25-150 μm.

Preferably the method comprises forming the mixture into a shape having a wall thickness of 100 μm.

Preferably the method comprises forming the mixture into single-wall tubing.

Optionally the method comprises forming the mixture into multi-wall tubing.

Preferably the method comprises forming the mixture into a bladder.

Preferably the method comprises pressing the mixture.

Preferably the method comprises pressing the mixture with a pressing force of 1-100 kN.

Preferably the method comprises pressing the mixture with a pressing force of 50 kN.

Optionally the method comprises forming the mixture into one or more sheets.

Preferably the method comprises forming the mixture into a sheet having a thickness of 25-150 μm.

Preferably the method comprises forming the mixture into a sheet having a thickness of 100 μm.

Preferably the method comprises extruding the mixture.

Preferably the method comprises extruding the mixture using an extrusion die.

Preferably the method comprises setting the die gap opening of the extrusion die to a predetermined gap value.

Preferably the method comprises setting the die gap opening of the extrusion die to 25-150 μm.

Preferably the method comprises setting the die gap opening of the extrusion die to 100 μm.

Ideally the method comprises cooling the formed mixture.

Ideally the method comprises cooling the formed mixture using air.

Ideally the method comprises cooling the formed mixture using air blown within or around the walls of the tubing.

Ideally the method comprises cooling the formed mixture using a liquid coolant.

Ideally the method comprises cooling the formed mixture using a water bath.

Ideally the method comprises cooling the formed mixture to a temperature below 80° C.

Preferably the method comprises exposing the flexible heat transfer material to high shear.

Preferably the method comprises stretching the flexible heat transfer material. Advantageously stretching the mixture increases the strength of the flexible heat transfer material.

Preferably the method comprises stretching the flexible heat transfer material between rollers.

Preferably the method comprises stretching the formed heat transfer material to increase the length thereof by 5-20%.

According to a third aspect of the invention there is provided a method of forming a flexible duct for insertion into a battery pack comprising one or more cells, the method comprising: preparing a mixture comprising a filler and a raw material capable of forming a matrix; forming the mixture into a generally tubular shape; and hardening, curing or drying the formed mixture to form the duct, wherein the thermal conductivity of the filler is greater than the thermal conductivity of the matrix. Advantageously, the method provides a process by which a duct having a desired flexibility and thermal conductivity can be produced for thermally managing cells within a battery pack.

Preferably the step of forming the mixture into a tubular shape comprises forming the mixture into a tube or bladder.

Preferably the step of forming the mixture into a tubular shape comprises forming the mixture into a single-lumen tube.

Preferably the step of forming the mixture into a tubular shape comprises forming the mixture into a multi-lumen tube.

Preferably the method further comprises installing the duct in a battery pack comprising one or more cells.

Preferably the method comprises installing the duct such that the duct contacts at least a part of the one or more cells.

Preferably the method comprises attaching the duct to a delivery means for coolant.

Preferably the method comprises attaching the duct to a coolant feed line.

Preferably the method comprises inflating the duct with coolant such that the at least part of the duct conforms to at least part of the surface shape of at least one cell.

Preferably the method comprises reinforcing at least part of the duct with a reinforcement means.

Preferably the method comprises at least partially surrounding the duct with a reinforcing means. Advantageously, the reinforcing means provides strength to the walls of the duct in order prevent the duct from over-inflating and/or bursting.

According to a fourth aspect of the invention there is provided a method of forming a thermal interface material (TIM) for use in a battery pack comprising a metallic duct and a plurality of cells, the method comprising: preparing a mixture comprising a filler and a raw material capable of forming a matrix; forming the mixture into a sheet; and hardening, curing or drying the mixture to form the TIM, wherein the thermal conductivity of the filler is greater than the thermal conductivity of the matrix. Advantageously, the TIM exhibits both a low electrical conductivity so that it can electrically insulate the cells from the duct, as well as an elevated thermal conductivity due to the inclusion of the filler.

Preferably the method further comprises installing the TIM in a battery pack comprising a metallic duct and one or more cells.

Preferably the method further comprises installing the TIM between the metallic duct and at least one cell. Advantageously, the TIM prevents electrical coupling between the cells and the electrically-conductive duct.

It will be appreciated that optional features applicable to one aspect of the invention can be used in any combination, and in any number. Moreover, they can also be used with any of the other aspects of the invention in any combination and in any number. This includes, but is not limited to, the dependent claims from any claim being used as dependent claims for any other claim in the claims of this application.

The invention will now be described with reference to the accompanying drawings which show, by way of example only, a preferred embodiment of an apparatus in accordance with the invention.

Figure 4A:
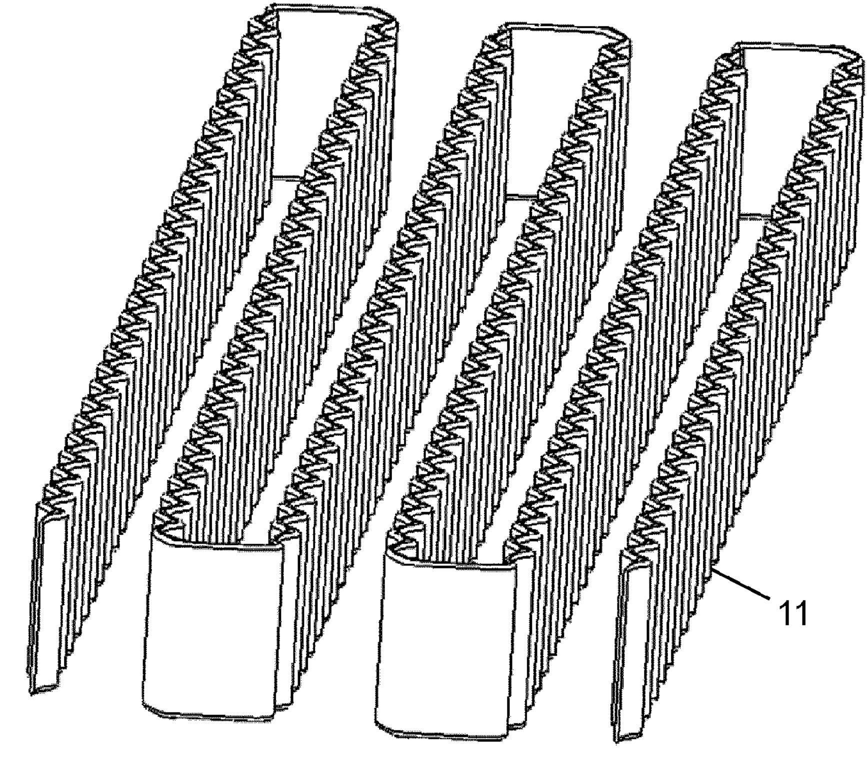

FIG. 4*a* is a perspective view of a serpentine duct comprising a heat transfer material according to an aspect of the invention.

Figure 4B:
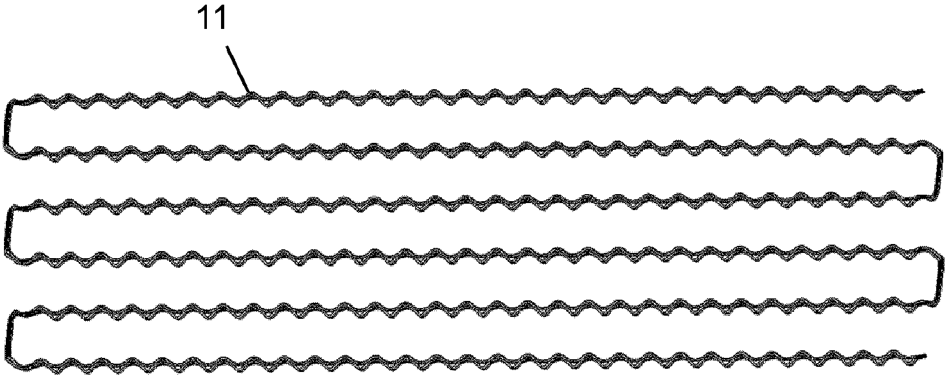

FIG. 4*b* is a top view of the serpentine duct shown in FIG. 4*a*.

Figure 4C:
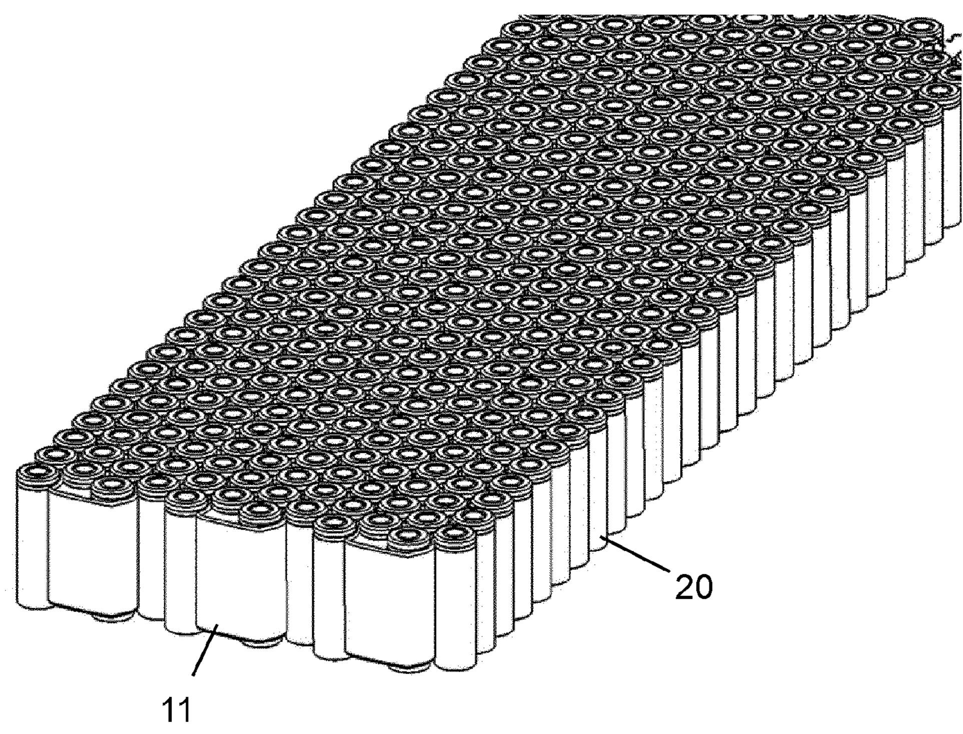

FIG. 4*c* is a perspective view of the serpentine duct shown in FIG. 4*a* among a plurality of cells.

Figure 5A:
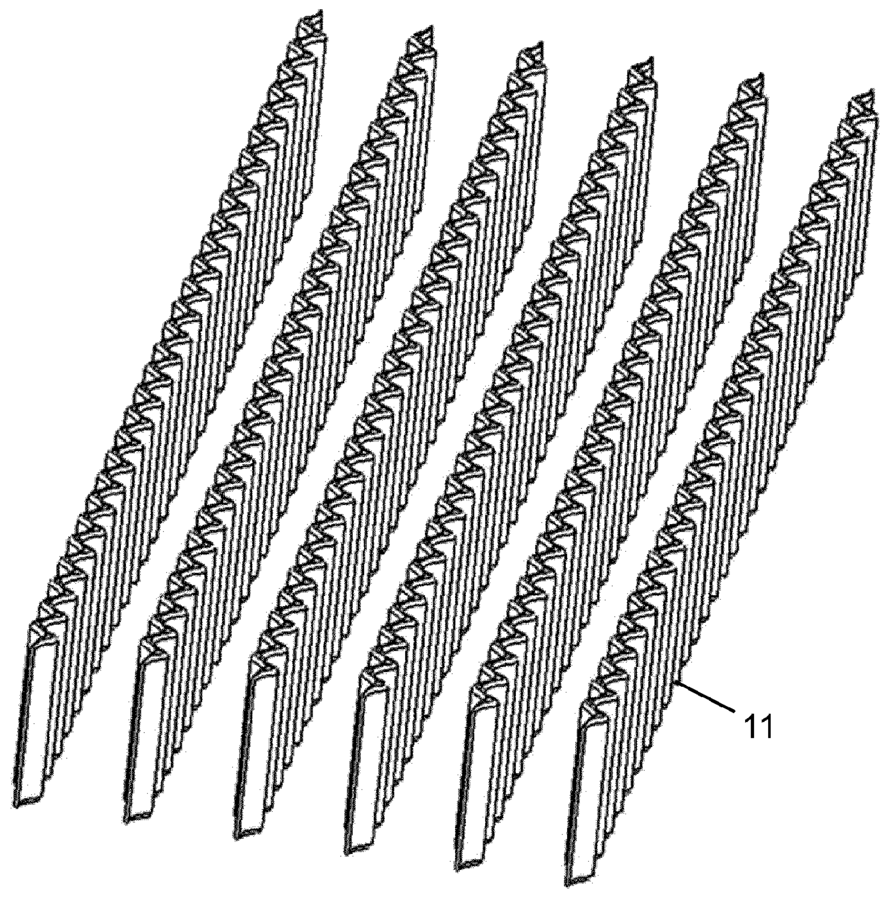

FIG. 5*a* is a perspective view of a manifold duct comprising a heat transfer material according to an aspect of the invention.

Figure 5B:
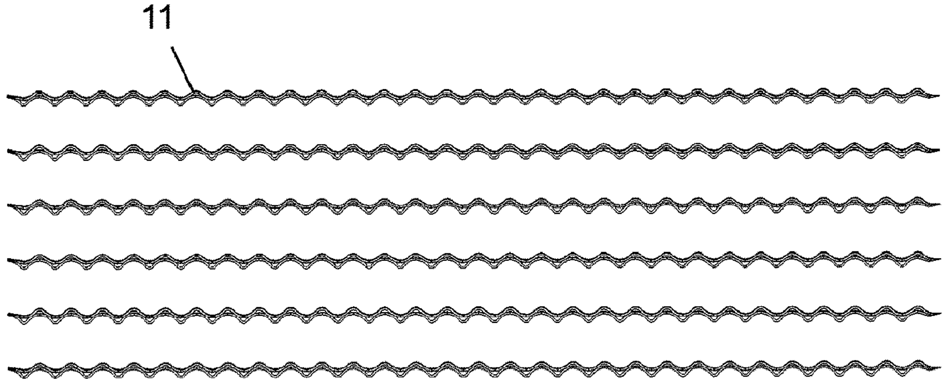

FIG. 5*b* is a top view of the manifold duct shown in FIG. 5*a*.

Figure 6:
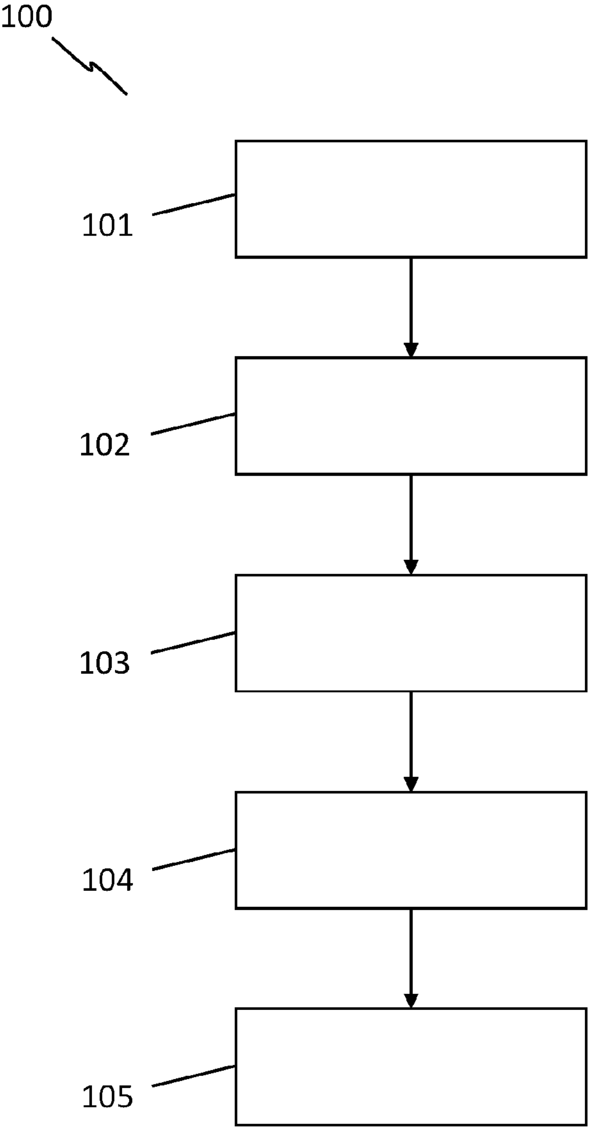

FIG. 6 is a schematic view of a method of forming a heat transfer material according to an aspect of the invention.

Figure 7:
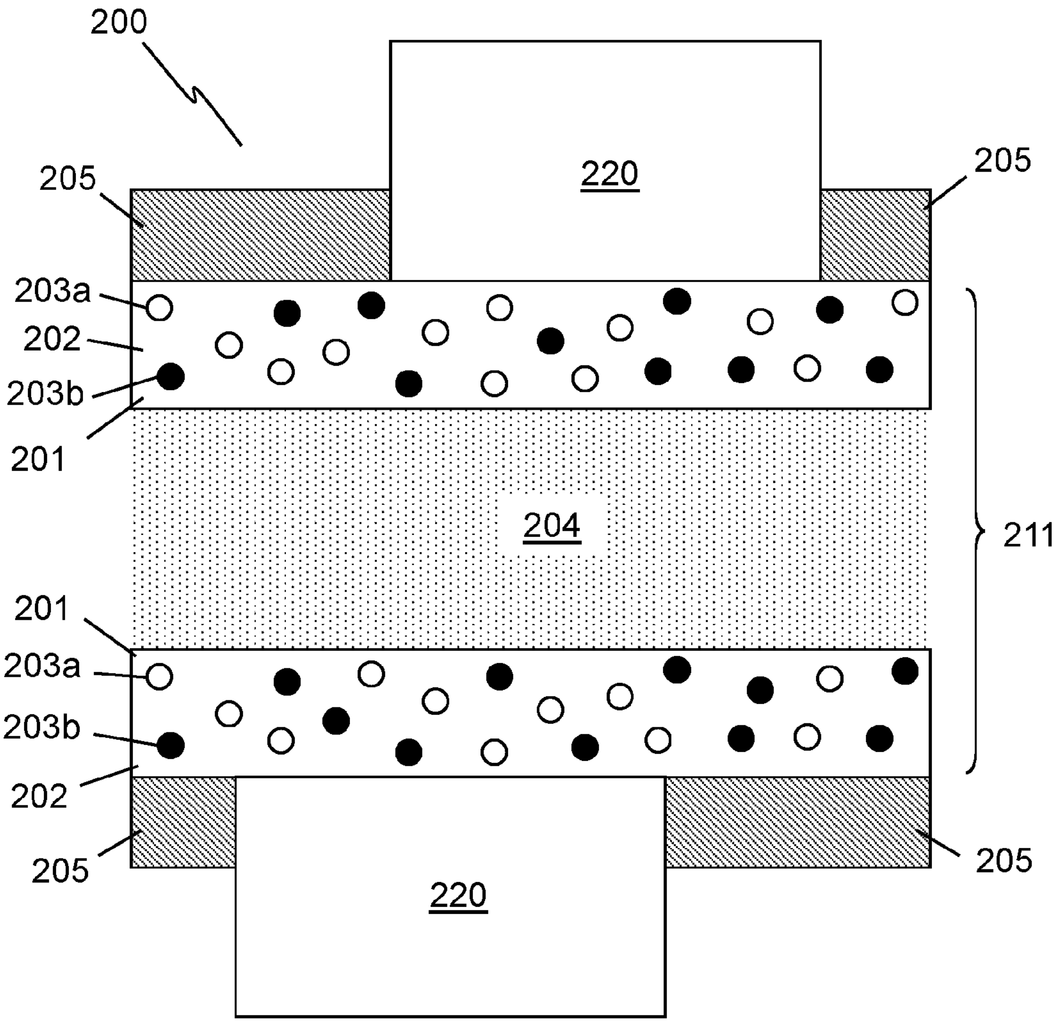

FIG. 7 is a cross sectional schematic view of a duct comprising a further heat transfer material according to the invention.

Figure 1:
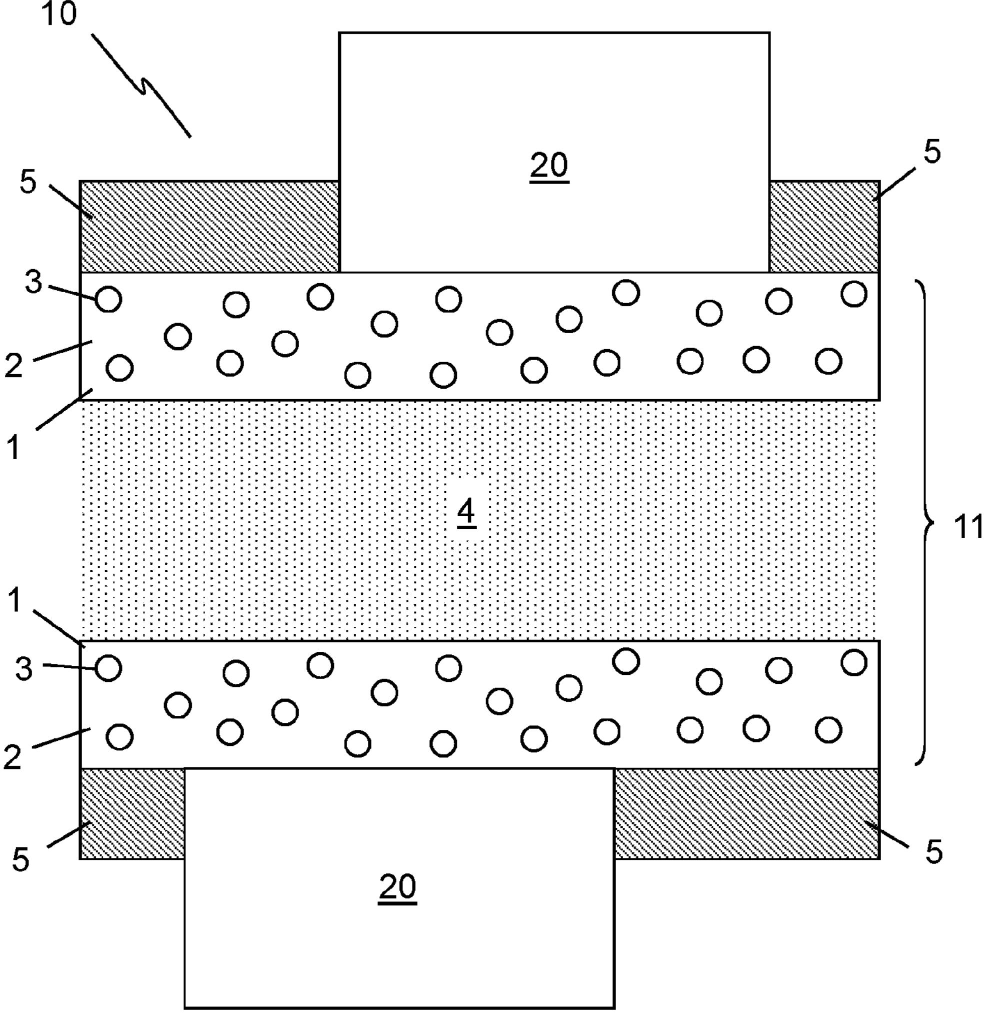
FIG. 1 is a cross sectional schematic view of a duct comprising a heat transfer material according to the invention.

In FIG. 1 there is shown a schematic cross section of a battery pack indicated generally by the numeral 10. The battery pack 10 includes a duct 11 used to thermally manage cells 20. The duct 11 comprises flexible heat transfer material 1 comprising a matrix 2 and a filler 3. The flexible duct carries a fluid coolant 4 such as air, water or a water-glycol mixture. Heat is transferred between cells 20 and the coolant 4 via the heat transfer material 1. The flexible duct is used to maintain the cells within a temperature envelope between 20° C. and 30° C. The heat transfer material 1 (i.e. the duct wall) has a thickness of 100 μm allowing suitable heat transfer between the cells 20 and coolant 4.

The flexible heat transfer material 1 is elastically deformable so that the duct 11 can be inflated using pressurised coolant 4. In the present example the Young's modulus of the heat transfer material is less than 300 MPa. In its inflated state, the height of the duct is between 55 mm and 70 mm and the width of the duct in the inflated state between 1 mm and 3 mm.

Figure 2:
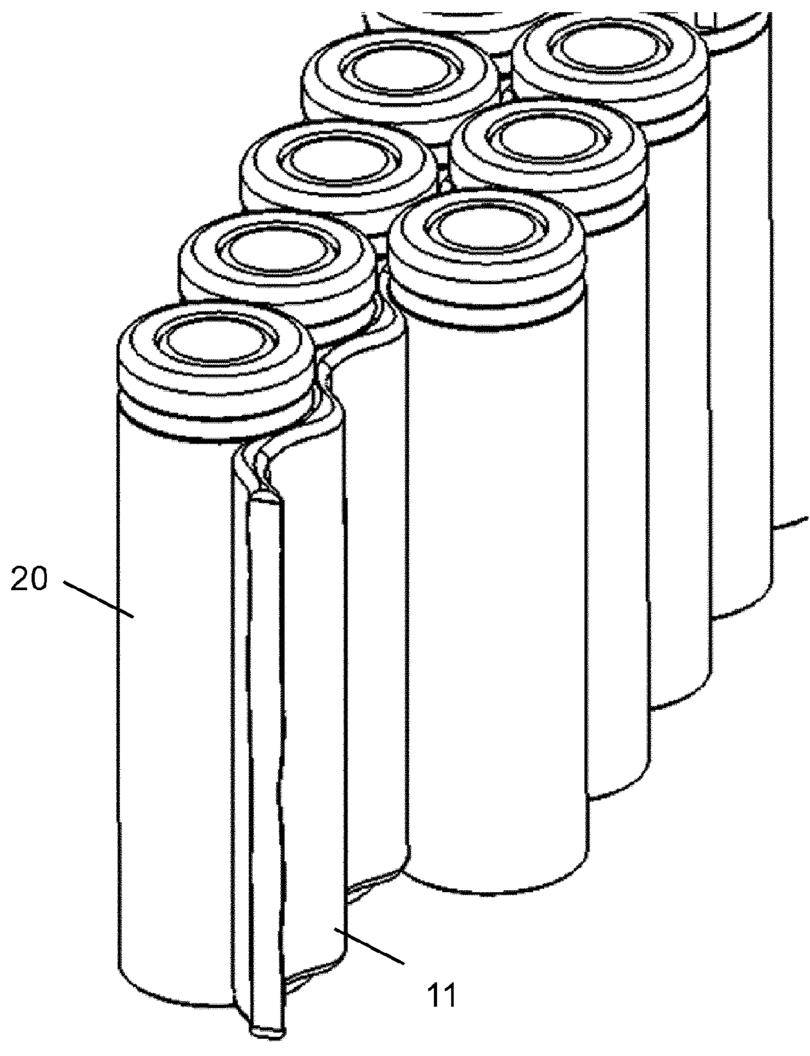
FIG. 2 is a perspective view of a plurality of cells in thermal contact with a duct comprising a heat transfer material according to an aspect of the invention.
Figure 3:
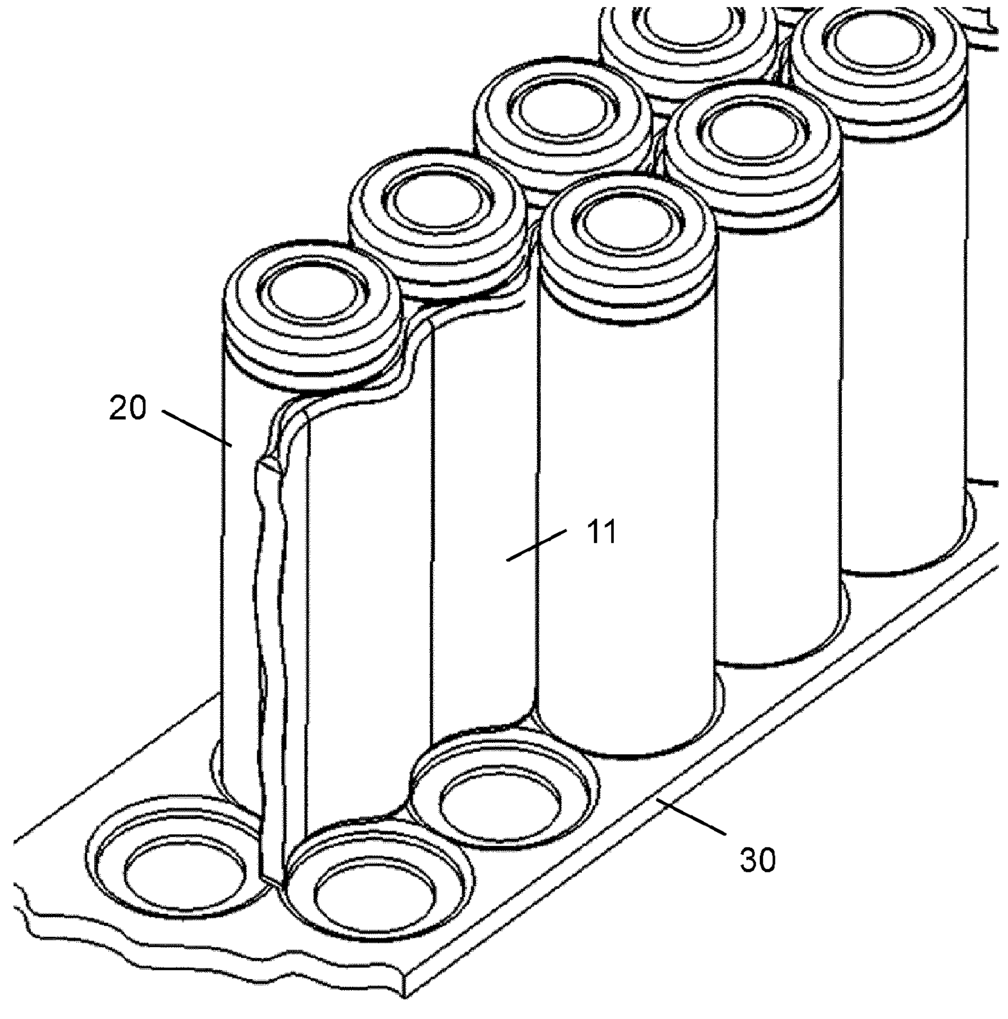
FIG. 3 is a perspective view of a plurality of cells in thermal contact with a duct comprising a heat transfer material according to an aspect of the invention and mounted on a base plate.

Inflation of the duct 11 causes the surface of the duct 11 to conform to the surface shape of the cells 20. Where the cells are cylindrical (e.g. 2170 or 18650 cells; see FIGS. 2 and 3), the parts of the duct 11 in contact with the cells 20 adopt a substantially semicircular shape with an angular contact area of approximately 80-90°. FIGS. 2 and 3 show the duct 11 among a plurality of cells 20 with part of the side wall of each cell 20 being in thermal and physical contact with part of the duct 11. FIG. 3 further shows each cell being accommodated in a respective recess in a base plate 30.

The matrix 2 is a flexible polymer material, in this case LDPE. The filler 3 comprises particles of a filler material and these are dispersed throughout the matrix 2 (see FIG. 1). The particles of filler material are elongate and tubular having a diameter of 1-10 nm and a length of 0.5-5 nm. In preferred embodiments the filler 3 comprises NANOCYL® NC7000 series thin multiwall carbon nanotubes. The heat transfer material 1 comprises 15% by volume of filler 3.

In this example, the matrix 2 has a thermal conductivity less than 10 $Wm^{-1}K^{-1}$ at room temperature. The thermal conductivity of the filler 3 is greater than the thermal conductivity of the matrix 2. Incorporating a limited amount of filler into the matrix provides an increased thermal conductivity while maintaining a low electrical conductivity and favourable mechanical properties (i.e. suitable flexibility for an inflatable duct).

In this example, the heat transfer material 1 has a thermal conductivity greater than 1 $Wm^{-1}K^{1}$ at room temperature. This means that the heat transfer through the duct 11 is better than a conventional polymer duct. The heat transfer material 1 itself is electrically insulating, since the electrical conductivity of the heat transfer material 1 is dominated by the electrical properties of the non-conductive matrix 2. The electrically insulating nature of the heat transfer material 1/matrix 2 significantly reduces the risk of short circuits when compared with a metallic duct.

Returning to FIG. 1, the duct 11 is partially surrounded by a reinforcing material 5. The reinforcing material 5 acts to reinforce the duct 11 at places where it does not contact the wall of a cell 20. The reinforcing material 5 and cells 20 provide a rigid structure around the duct 11 to prevent over-inflation and possible bursting during operation. Incorporation of filler 3 within matrix 2 can alter the mechanical properties of the heat transfer material 1, particularly for high concentrations of filler 3. Where this leads to any reduction in mechanical strength the reinforcing material 5 can be used counteract such effects.

FIGS. 4*a* and 4*b* show perspective and top views of the duct 11 in a serpentine configuration, respectively. FIG. 4*c* shows the serpentine configuration of duct 11 in contact with a plurality of cells 20. FIGS. 5*a* and 5*b* show perspective and top views of a plurality of substantially straight ducts 11 in a manifold configuration, respectively.

FIG. 6 shows a method 100 of forming a flexible heat transfer material 1 comprising a matrix 2 and a filler 3. The method 100 comprises: preparing a mixture comprising the filler 3 and a viscous material capable of forming the matrix 2 (step 101); forming the mixture into a desired shape (step 102); and hardening, curing or drying the mixture to form the flexible heat transfer material (step 103). In the method 100 a filler 3 having a thermal conductivity which is greater than the thermal conductivity of the matrix 2 is used.

In step 101 a viscous material is formed by heating pellets or granules of LDPE polymer such that the polymer enters a viscous state. Heating the pellets to 150° C. provides a suitable viscosity for mixing of the filler 3 and matrix 2. Ideally the filler 3 is a quantity of expanded graphite particles having a size of <1_μm. Alternatively the filler 3 can be a quantity of NANOCYL® NC7000 series thin multiwall carbon nanotubes. 15% by volume of the filler 3 is added to the viscous polymer via pouring. In order to evenly disperse the filler throughout the viscous mixture, the mixture is agitated via shear mixing for 1-25 minutes at 100-600 rpm.

In an alternative embodiment in step 101 the viscous material is formed by heating pellets containing both the matrix 2 (LDPE) and the filler 3 (multiwall carbon nanotubes).

In step 102 the viscous mixture is formed into a tubular shape by blown film process. Blown film involves continuous extrusion through an extrusion die having a gap opening of 0.5 mm whereby internal pressure source inflates the extruded section to form a "bubble" which is hauled off by a set of rollers which collapse the cooled bubble to seal the internal bubble pressure. The blown film mixture takes the form of single walled tube. In other examples the blown film mixture may take the form of a multi walled tube. There is also the option to employ a "co-extrusion" blown film process in which one or more layers of varying thickness are extruded to form a final duct comprising multiple layers with varying thermal, mechanical & electrical properties.

In an alternative step 102 the viscous mixture can be formed into a tubular shape by blow moulding. Blow moulding involves extruding the mixture through an extrusion die having a die gap opening set to 100 μm. The blow moulded mixture takes the form of single walled tube having a wall thickness of 100 μm. In other examples the blow moulded mixture may take the form of a multi walled tube.

In an alternative embodiment of the method 100, in step 102 the viscous mixture can be formed into a sheet for use as a TIM material within a battery pack having a metallic/conductive thermal management duct and a plurality of cells. According to this alternative the mixture is formed into a sheet having a thickness of 100 μm.

In step 103 the formed mixture is cooled continuously by air/water cooling ring typical of blown film processes. The mechanical properties of the duct are affected by the radial & axial expansion of the duct. The final wall thickness & height of the duct are also set by the expansion ratio & haul off rate of the winders. The formed mixture is hardened via cooling to a temperature below 80° C. The mixture is cooled using a suitable fluid such as air blown within or around the walls of the tubing or by using liquid coolant such as water wherein the tubing is passed through a water bath.

The formed and cooled flexible heat transfer material 1 is exposed to high shear in step 104 via stretching between rollers. Stretching the heat transfer material 1 between rollers increases the strength of the material, by aligning the polymer chains within the matrix 2. The formed heat transfer material 1 is stretched by 5-20%.

In step 105 the heat transfer material 1 is installed within a battery pack comprising one or more cells.

Where the heat transfer material 1 is formed into a duct 11, the duct 11 is cut to an appropriate length and inserted within the pack between cells 20 (see e.g. FIGS. 2-5). The duct 11 can be heat welded to intake/exhaust nozzles for connection to a coolant circuit. The duct 11 is attached to a coolant feed line and inflated with coolant such that part of the duct 11 conforms to part of the surface shape of at least one cell 20 within the battery pack. Reinforcing material 5 can be inserted into the pack to at least partially surround the duct. Particularly, the duct is surrounded in places where it does not in contact a cell 20. The reinforcing material 5 reinforces the walls of the duct 11 to prevent the duct 11 from over-inflating and/or bursting in use. The reinforcing material 5 can be e.g. a potting material such as an expanding foam, intumescent foam or epoxy resin, a rigid plastic or metallic structure located within the battery pack or one or more walls of the battery pack housing.

Where the heat transfer material 1 has been formed into a sheet and is to be used as a TIM material, the heat transfer material 1 is cut to an appropriate size and installed within a battery pack between a metallic duct and at least one cell 20.

In FIG. 7 there is shown a schematic cross section of a further battery pack indicated generally by the numeral 200. The battery pack 200 includes a duct 211 used to thermally manage cells 220. The duct 211 comprises flexible heat transfer material 201 comprising a matrix 202 and a filler 203. The flexible duct carries a fluid coolant 204 such as air, water or a water-glycol mixture. Heat is transferred between cells 220 and the coolant 204 via the heat transfer material 201. The flexible duct is used to maintain the cells within a temperature envelope between 20° C. and 30° C. The heat transfer material 1 (i.e. the duct wall) has a thickness of 100 μm allowing suitable heat transfer between the cells 20 and coolant 204. The duct 211 is partially surrounded by a reinforcing material 205.

The duct 211 of FIG. 7 is similar to that of FIG. 1 except that the filler 203 comprises a mixture of two types of particles: carbon-based particles 203*a* and ceramic-based particles 203*b*. Particularly, the filler 203 is a mixture of graphite particles 203*a* and boron nitride particles 203*b*. The boron nitride particles have a size less than 5 μm. The ratio of carbon-based particles to ceramic-based particles is 1:1 by volume in this example, but the skilled person will appreciate that the ratio can be any suitable ratio which provides a suitable thermal conductivity, such as 1:10 and 10:1 by volume. In this example, the matrix 202 has a thermal conductivity of approximately 0.8 $Wm^{-1}K^{-1}$.

As will be understood by the skilled person, the example embodiment(s) presented above can be modified in one or more ways without departing from the scope of the invention.

The matrix 2 may comprise any suitable material that is flexible and is capable of hosting filler particles. Examples of appropriate matrix materials include polyester, silicone, rubber, LLDPE and HDPE.

The filler 3 may comprise any suitable material that has a higher thermal conductivity than the matrix 2 and can be incorporated into the matrix 2. The filler 3 may comprise an organic material such as carbon, carbon black, graphite, graphite platelets, graphene or multi-walled carbon nanotubes. Alternatively or additionally, the filler 3 may comprise an inorganic or ceramic filler material such as aluminium oxide, silicon carbide, boron nitride, silicon nitrate, alumina, aluminium nitride or zinc oxide. Depending on the thermal conductivity of the matrix 2, the filler 3 may have a thermal conductivity greater than 1 $Wm^{-1}K^{-1}$. The particles of filler 3 may have any suitable size and shape for incorporation into the matrix 2, for example an average diameter of between 1 nm and 10 μm and a shape that is substantially spherical, plate-like or fiberous.

The heat transfer material 1 may include any suitable amount of filler such as less than 30% by volume, less than 25% by volume or 5-18% by volume of filler 3. The heat transfer material 1 may have a thermal conductivity of at least 1 $Wm^{-1}K^{-1}$ at room temperature.

The absolute thermal resistance of the duct 11 may be less than 0.5 $KW^{-1}$, less than 0.05 $KW^{-1}$ or less than 0.005 $KW^{-1}$. The duct may be a multi-lumen duct. The cells 20 may include a protective plastic sheath and may be cylindrical or prismatic.

The matrix 2 may be manufactured using any suitable method and may employ any suitable material capable of forming the matrix 2. For example, the matrix 2 may be formed by dissolving a raw material in a solvent and evaporating the solvent. Alternatively, the matrix 2 may be formed by mixing and/or heating one or more precursor materials such that the precursor materials undergo a polymerization reaction. The method may comprise heating pellets or granules of any suitable polymer such as LDPE, LLDPE, HDPE, polyester, silicone or rubber. The pellets may be heated above their melting point which may be at least 130° C.

The method may comprise wetting the filler prior to adding the filler to the viscous material. The method may comprise adding less than 25% by volume of the filler to the viscous material or adding 5-18% by volume of the filler to the viscous material. The method may comprise pressing the mixture a pressing force of 1-100 kN e.g. 50 kN. The method may comprise forming the mixture into a sheet having a thickness of 25-150 μm, or a tubular shape having a wall thickness of 25-150 μm.

The flexible heat transfer material may be extruded, cast or moulded into a desired shape or form, such as a blown, cast or moulded film. One or more cells may be attached to the flexible heat transfer material, for example using an adhesive and/or polyurethane foam. A surface treatment may be applied to the flexible heat transfer material to enhance heat transfer through the flexible heat transfer material. Where the flexible heat transfer material is used to form a duct, the duct may include one or more internal fins, such as lengthwise fins, to increase surface area of the material.

The flexible heat transfer material may include a fire retardant additive or surface treatment to modify flame retardant properties e.g. cross linking of PE matrix to change the polymer from a thermoplastic to a thermoset. A surface treatment such as a plasma activation process may be applied to the flexible heat transfer material to modify the adhesion properties of the flexible heat transfer material. In particular, the adhesion properties of the flexible heat transfer material may be improved along one or more portions thereof, to improve the bonding strength between the heat transfer material and components attached thereto. Conversely, the adhesion properties of the flexible heat transfer material may be intentionally worsened along one or more portions thereof, to facilitate separation of the flexible heat transfer material from other components during recycling.

In the preceding discussion of the invention, unless stated to the contrary, the disclosure of alternative values for the upper or lower limit of the permitted range of a parameter, coupled with an indication that one of the values is more highly preferred than the other, is to be construed as an implied statement that each intermediate value of the parameter, lying between the more preferred and the less preferred of the alternatives, is itself preferred to the less preferred value and also to each value lying between the less preferred value and the intermediate value.

The features disclosed in the foregoing description or the following drawings, expressed in their specific forms or in terms of a means for performing a disclosed function, or a method or a process of attaining the disclosed result, as appropriate, may separately, or in any combination of such features be utilised for realising the invention in diverse forms thereof.

The invention claimed is:

1. Material for thermally A flexible heat transfer contacting at least one cell within a battery pack, the flexible heat transfer material being conformable to at least part of the surface shape of at least one cell, the flexible heat transfer material comprising a matrix and a filler, wherein the thermal conductivity of the filler is greater than the thermal conductivity of the matrix and wherein the flexible heat transfer material forms at least a part of an inflatable thermal management duct.

2. A flexible heat transfer material according to claim 1 wherein the duct is located within a battery pack comprising one or more cells.

3. A flexible heat transfer material according to claim 2 wherein at least part of the duct is in contact with a surface of at least one cell.

4. A flexible heat transfer material according to claim 2 wherein the duct is inflated such that at least part of the duct conforms to at least part of the surface shape of at least one cell.

5. A flexible heat transfer material according to claim 1 wherein the duct is at least partially surrounded by a reinforcing means.

6. A flexible heat transfer material according to claim 5 wherein the reinforcing means is a potting means.

7. A flexible heat transfer material according to claim 5 wherein the reinforcing means is expandable foam.

8. A flexible heat transfer material according to claim 5 wherein reinforcing means is polyurethane or intumescent foam.

9. A flexible heat transfer material according to claim 1 wherein the heat transfer material has a thickness of 25-150 μm.

10. A flexible heat transfer material according to claim 1 wherein the heat transfer material has a thickness of 100 μm.

11. A flexible heat transfer material according to claim 1 wherein the heat transfer material comprises less than 30% by volume of filler.

12. A flexible heat transfer material according to claim 1 wherein the heat transfer material comprises less than 25% by volume of filler.

13. A flexible heat transfer material according to claim 1 wherein the heat transfer material comprises 5-18% by volume of filler.

14. A flexible heat transfer material according to claim 1 wherein the heat transfer material comprises 15% by volume of filler.

15. A flexible heat transfer material according to claim 1 wherein the matrix is electrically insulating.

16. A flexible heat transfer material according to claim 1 wherein the matrix is a polymer matrix.

17. A flexible heat transfer material according to claim 1 wherein the matrix comprises polyethylene (PE).

18. A flexible heat transfer material according to claim 1 wherein the matrix comprises low-density polyethylene (LDPE), linear low-density polyethylene (LLDPE) or high-density polyethylene (HDPE).

19. A flexible heat transfer material according to claim 1 where the filler is in the form of particles, and wherein particles of a filler material are dispersed throughout the matrix.

20. A flexible heat transfer material according to claim 1 where the filler is in the form of particles, and wherein the particles of filler material have an average diameter of between 1 nm and 10 μm.

21. A flexible heat transfer material according to claim 1 wherein the filler comprises a carbon-based filler.

22. A flexible heat transfer material according to claim 21 wherein the filler comprises carbon, carbon black, graphite, graphene, multi-walled carbon nanotubes or single-wall carbon nanotubes.

23. A flexible heat transfer material according to claim 1 wherein the filler comprises a ceramic filler.

24. A flexible heat transfer material according to claim 23 wherein the filler comprises aluminium oxide, silicon carbide, boron nitride, silicon nitrate, alumina, aluminium nitride or zinc oxide.

25. A flexible heat transfer material according to claim 1 wherein the filler comprises carbon-based particles and ceramic-based particles.

26. A flexible heat transfer material according to claim 25 wherein the filler comprises graphite particles and boron nitride particles.

* * * * *